United States Patent [19]

Nakagawa et al.

[11] Patent Number: 5,377,174
[45] Date of Patent: Dec. 27, 1994

[54] DISK CHANGER HAVING A DISK TRAY MOVED BY A PAIR OF SLIDABLE, PARALLEL RACKS

[75] Inventors: Yoshiaki Nakagawa, Yokohama; Takashi Suzuki, Tokyo; Yasuyoshi Kagohashi; Seiji Nakama, both of Yokohama; Hajime Daigaku, Sagamihara; Tukasa Nakayama; Shinji Sekiya, both of Yokohama, all of Japan

[73] Assignee: Matsushita Electric Industrial Co., Ltd., Kadoma, Japan

[21] Appl. No.: 890,104

[22] Filed: May 29, 1992

[30] Foreign Application Priority Data

Jun. 6, 1991 [JP] Japan .................. 3-134845

[51] Int. Cl.5 ............................................ G11B 17/22
[52] U.S. Cl. .................................. 369/34; 369/38; 360/98.06
[58] Field of Search ................. 369/34, 36, 37, 38; 360/98.06, 98.04, 85, 86; 74/89.11, 89.12

[56] References Cited

U.S. PATENT DOCUMENTS 4,796,244  1/1989  Tsuruta et al. ................. 369/38
5,034,935  7/1991  Ishibashi et al. ............... 369/36
5,166,843  11/1992  Kuwajima ...................... 360/85

FOREIGN PATENT DOCUMENTS

3421947A1  6/1984  Germany .
3914130A1  4/1989  Germany .
2208748    8/1988  United Kingdom .

OTHER PUBLICATIONS

Haug et al, IBM Technical Disclosure Bulletin, "Positioning Device", vol. 1, No. 1, Jun. 1958.

Primary Examiner—Stuart S. Levy
Assistant Examiner—David Ometz
Attorney, Agent, or Firm—Popham, Haik, Schnobrich & Kaufman, Ltd.

[57] ABSTRACT

The disk changer comprises a first rack member supporting on its one end side a latch pawl adapted to latch a pin, and a second rack member supporting on its other end side a latch pawl adapted to latch the pin, the first and second rack members being slidably supported in parallel with each other. After the first rack member transfers a tray by a predetermined distance, latching of the tray thereon is switched over from the first rack member to the second rack member. The tray is then further transferred by the second rack member.

2 Claims, 5 Drawing Sheets

5,377,174

DISK CHANGER HAVING A DISK TRAY MOVED BY A PAIR OF SLIDABLE, PARALLEL RACKS

BACKGROUND OF THE INVENTION

The present invention relates to a disk changer used in combination with a magazine accommodating a plurality of disks, such as compact disks (CD's), therein to take desired one out of the magazine for playback.

Heretofore, there are known disk changers of the type for withdrawing of desired one of a plurality of trays accommodated in a magazine for playback. Such a conventional disk changer has a tray withdrawing mechanism wherein one end of a swing arm is engaged with a tray to withdraw the tray out of the magazine.

However, the tray withdrawing mechanism using a swing arm such as the above described prior art suffers from the problem that the swing arm moves over a wide range requiring enough space to ensure the wide range of movement of the swing arm, making it difficult to reduce the size of a disk changer.

SUMMARY OF THE INVENTION

It is an object of the present invention to solve the above-mentioned problem in the prior art, and provide a disk changer which has reduced size.

To achieve the above object, according to the present invention, a disk changer comprising first and second rack members supported in a slidable manner, a drive source for driving the first and second rack members, a first latch member for latching a driven member at one end side of the first rack member, a second latch member for latching the driven member at the other end side of the second rack member, and latching switchover means for switching over the driven member to be latched on the other rack member at the time one of the rack members latching said driven member thereon has moved to a predetermined position.

With the present invention thus arranged, when the drive source is actuated under condition that the driven member such as a tray holding a compact disk (CD) thereon is latched to one of the rack members by the associated latch member, one of the rack members is moved by a driving force of the drive source so that the driven member is also moved therewith. At the time the one of the rack members has moved to a predetermined position, the rack member latching the driven member thereon is switched over from one of the rack members to the other of the rack members, and then the driven member is further moved to the other of the rack members. In this way, the driven member is transferred by a predetermined distance with the successive movement of the first and second rack members.

DETAILED DESCRIPTION OF THE PREFERRED EMBODIMENTS

Figure 1:
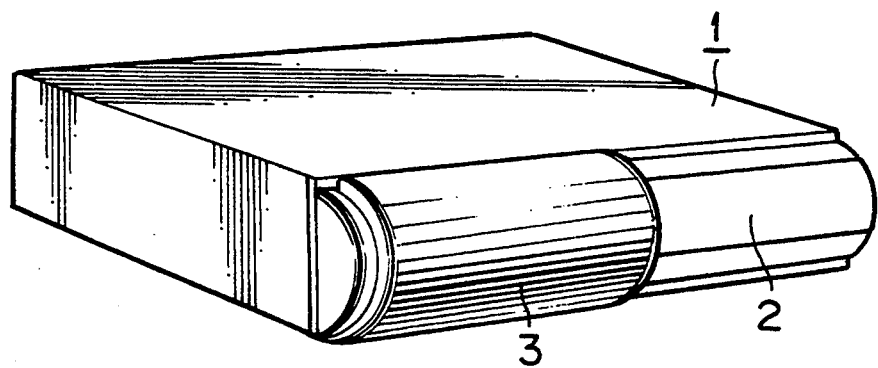
FIG. 1 is a perspective view of a disk changer according to a first embodiment of the present invention.

FIG. 1 shows an appearance of a disk changer for compact disks (CD's) according to one embodiment of the present invention. In FIG. 1, designated by the reference numeral 1, is a box-shaped housing which has a magazine insertion opening formed on the left side of its front surface 2. The reference numeral 3 designates a slide cover supported on the front surface 2 of the housing 1 in a slidable manner to the left and right for opening and closing the magazine insertion opening. FIG. 1 shows a state that the slid cover 3 is slide to the left side of the front surface 2 to close the magazine insertion opening.

Figure 2:
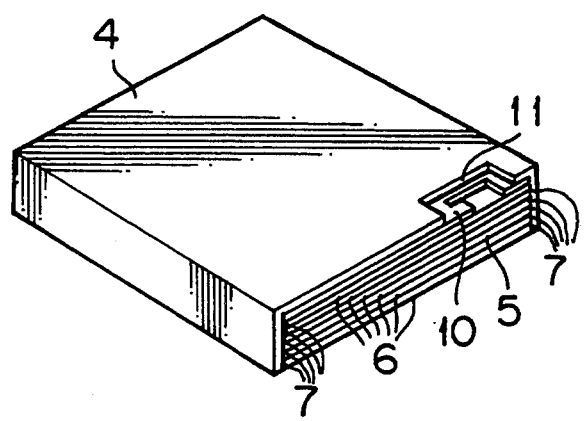
FIG. 2 is a perspective view of a magazine for use in the first embodiment.
Figure 3:
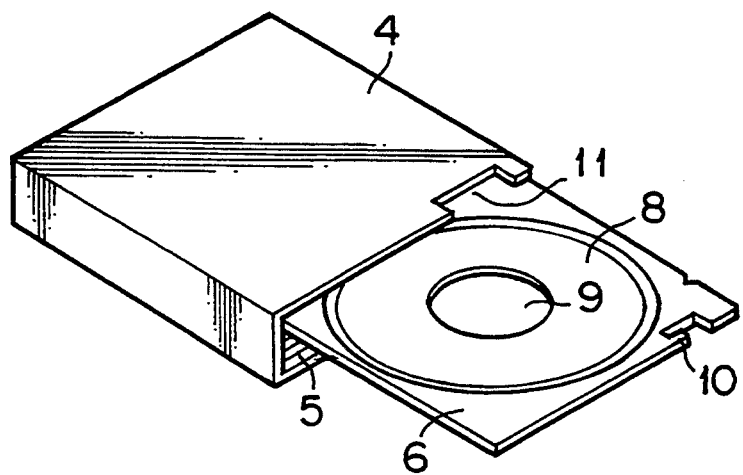
FIG. 3 is a perspective view showing a state that a tray is withdrawn out of the magazine for use in the first embodiment.

FIGS. 2 and 3 shows a magazine accommodating a plurality of CD's therein. In these drawings, designated by the reference numeral 4 is a box-shaped magazine body and 5 is an opening formed on one lateral side of the magazine body 4. On the inner wall surfaces of the magazine body 4, a plurality of guide pieces 7 are formed in parallel for guiding respective trays 6. A recess 8 is formed on the upper surface of each tray 6 which accommodates the CD therein and is formed at the center thereof with a hole 9. The reference numeral 10 is a hook lug formed on a front edge of the tray 6. A pawl of a tray withdrawing mechanism is engaged with the hook lug 10 for withdrawing the tray 6 out of the magazine body 4 or returning the tray 6 back into the magazine body 4. The reference numeral 11 is a cutout formed in the magazine body 4. In the disk changer of FIG. 1, the slid cover 3 is slide to the right to open the magazine insertion opening, and the magazine shown in FIG. 2 is inserted into the magazine insertion opening. The magazine shown in FIG. 2 is received on the left side of the housing 1 shown in FIG. 1, while the housing 1 accommodates in the right side thereof a tray withdrawing mechanism capable of moving up and down, a turntable for drivingly rotating the CD, a clamping mechanism for clamping the CD on the turntable, an optical pickup for reading data recorded on the CD, and so forth.

Figure 4:
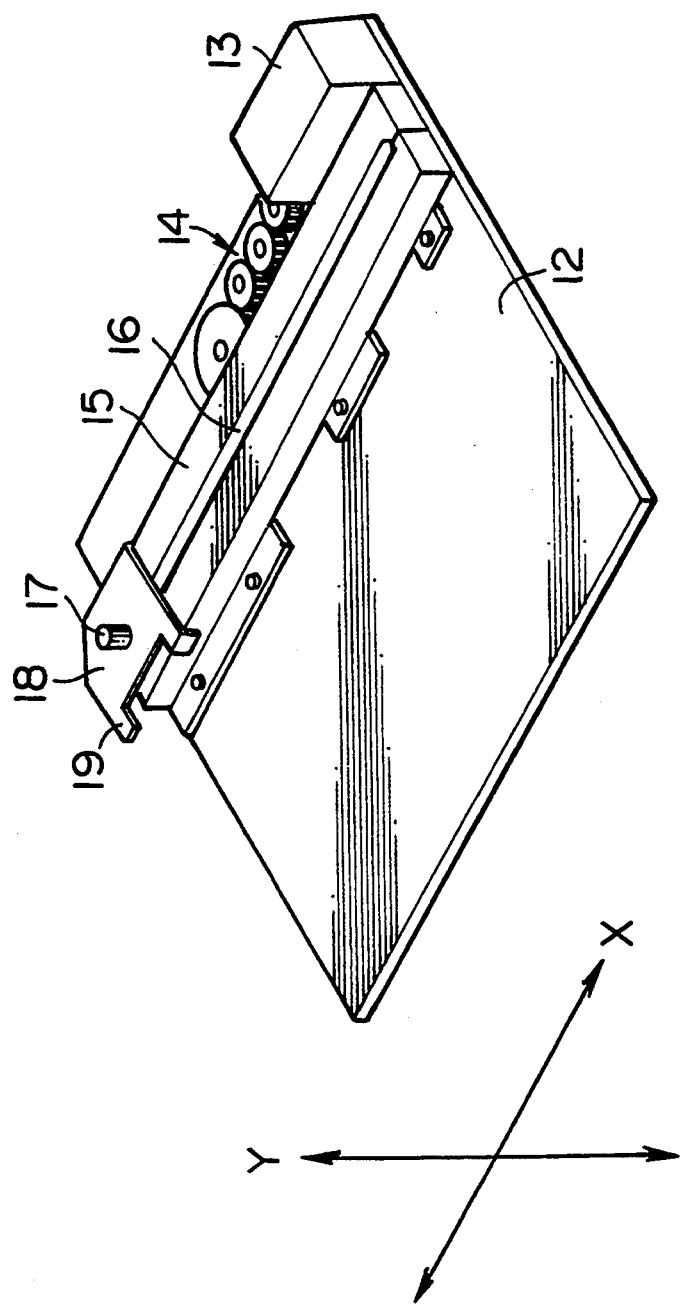
FIG. 4 is a perspective view of a tray withdrawing mechanism in the first embodiment.

FIG. 4 shows an elevating plate 12 supported to be movable in the housing 1 vertically in the direction of an arrow Y. In FIG. 4, designated by the reference numeral 13 is a motor mounted on the elevating plate 12, 14 is a gear train for transmitting a torque of the motor 13, and 15 is a guide member fixed to the upper surface of the elevating plate 12 for supporting a pair of rack plates (not shown) in a slidable manner. The reference numeral 16 is a guide hole formed in the guide member 15 to guide movement of a pin 17 therealong. The reference numeral 18 is a slide member capable of sliding on the upper surface of the guide member 15. The pin 17 is inserted through a hole in the slide member 18 so that the slide member 18 is driven by the pin 17. The reference numeral 19 is a pawl capable of engaging with the hook lug 10 of a particular tray within the magazine. In a state shown in FIG. 4, the pawl 19 of the slide member 18 engages with the hook lug 10 of the tray 6 selected from among plural trays in the magazine. When the motor 13 is rotated in that condition, the driving torque is transmitted through the gear train 14 to the rack plates in the guide member 15 for driving the pin 17 to move the same along the guide hole 16 in the direction of arrow X. Therefore, the slide member 18 is driven by the pin 17 to move together therewith, causing the tray 6 in the magazine to be withdrawn in the direction of arrow X. The CD on the withdrawn tray is clamped over the turntable by a clamping mechanism (not shown). It is to be noted that FIG. 1 shows an outline of only the tray withdrawing mechanism for withdrawing a tray out of the magazine and returning it back into the magazine.

Figure 5:
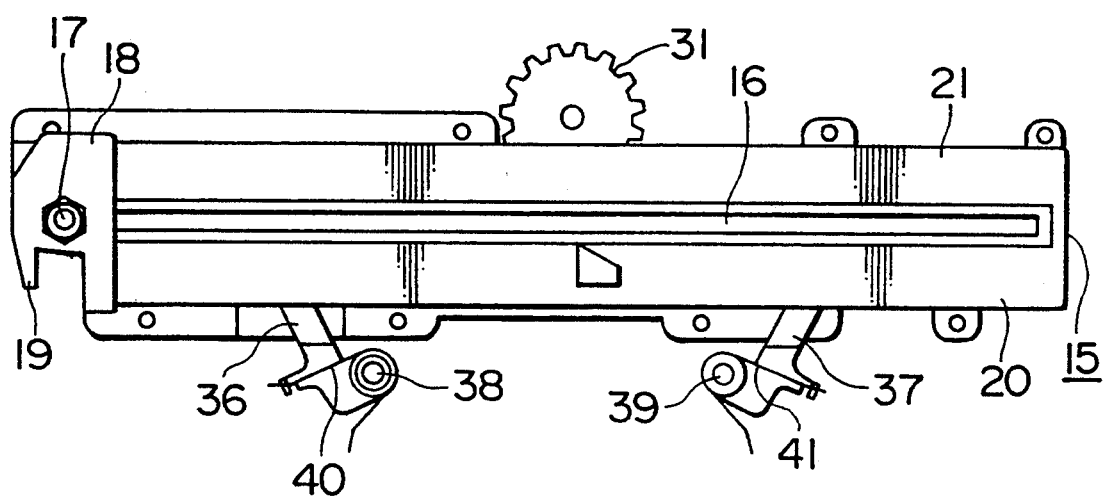
FIG. 5 is a top plan view of a tray withdrawing mechanism in the first embodiment.
Figure 7:
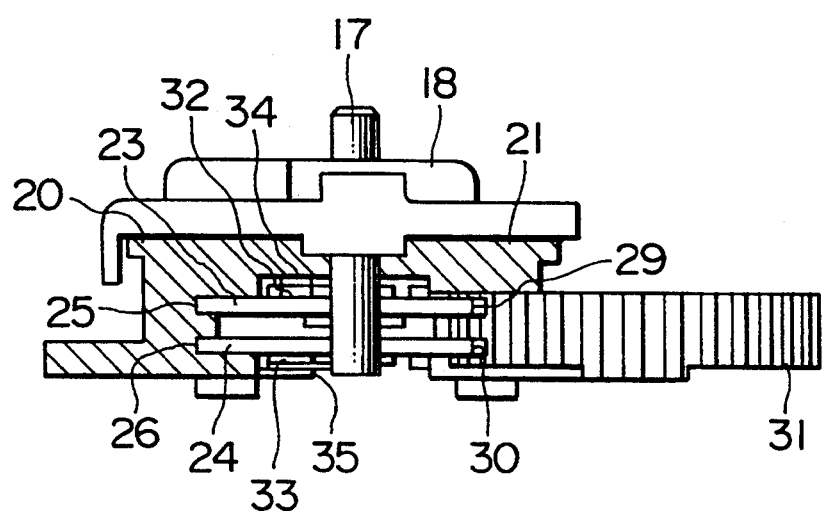
FIG. 7 is a side view, partly in section, of the tray withdrawing mechanism in the first embodiment.
Figure 6:
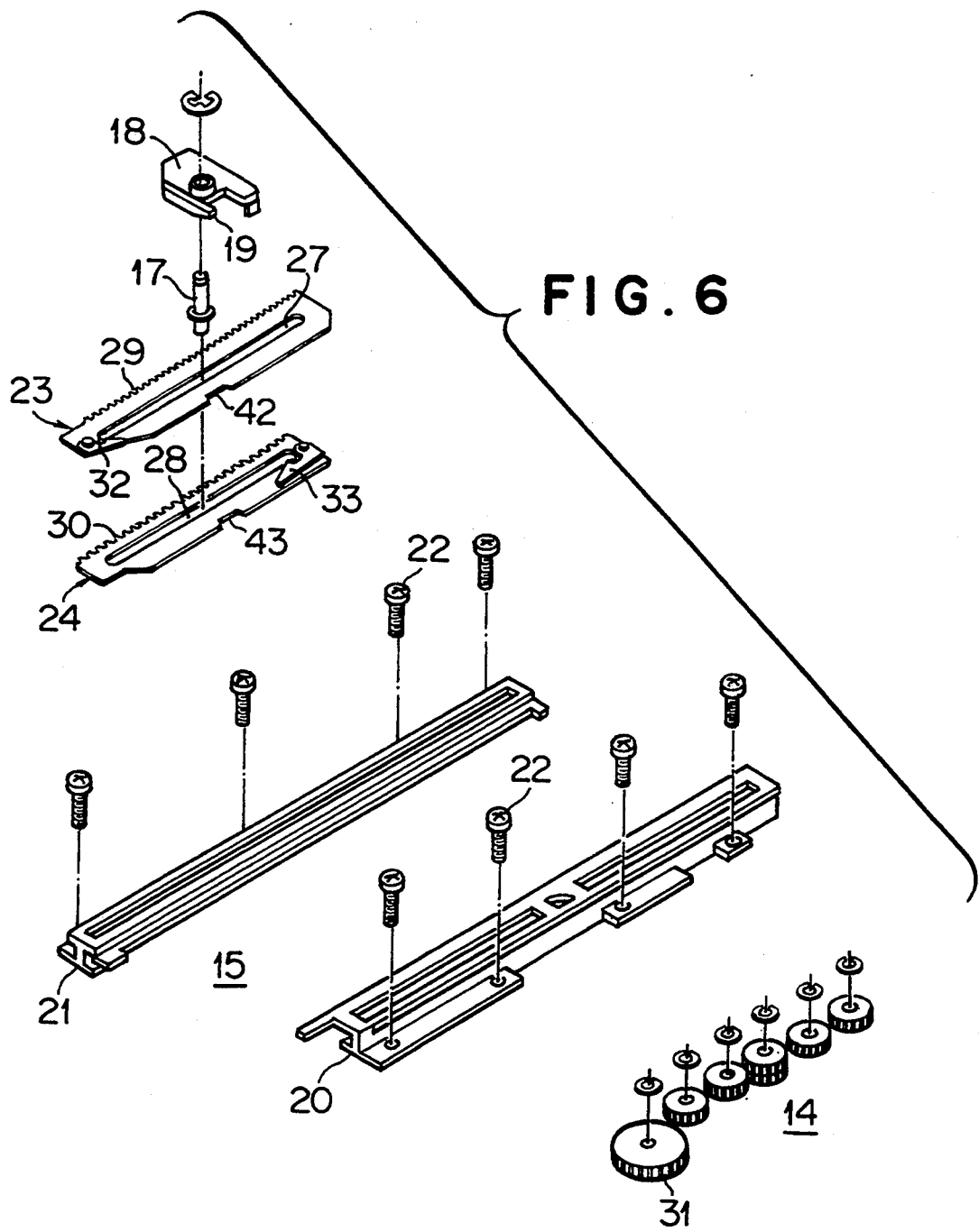
FIG. 6 is an exploded perspective view of the tray withdrawing mechanism in the first embodiment.

The tray withdrawing mechanism of this embodiment will be next described with reference to FIGS. 5 to 7 as well. The reference numerals 20, 21 are respectively first and second guide pieces jointly constituting the guide member 15. These guide pieces 20, 21 are fixed to the upper surface of the elevating plate 12 by screws 22. The guide hole 16 is formed between the first guide piece 20 and the second guide piece 21. The reference numerals 23, 24 are respectively first and second rack plates capable of sliding in the direction of an arrow X while being guided by two guide grooves 25, 26 (see FIG. 7) formed in the guide pieces 20, 21. The reference numerals 27, 28 are elongate holes respectively formed in the rack plates 23, 24 for receiving the pin 17. The reference numeral 29, 30 are toothed portions respectively formed on one side of the rack plates 23, 24. These toothed portions 29, 30 are both able to mesh with a gear 31 at the final stage of the gear train 14 rotatably supported on the elevating plate 12. The reference numeral 32 is a latch pawl rotatably supported at one end (the left end in FIG. 6) of the rack plate 23 on its upper surface, and 33 is a latch pawl rotatably supported on one end (the right end in FIG. 6) of the rack plate 24 on its lower surface. The latch pawls 32, 33 are respectively turned while being guided by guide surfaces 34, 35 (see FIG. 7) formed on the guide pieces 20, 21, in such a manner as to latch or release the pin 17. The aforesaid slide member 18 is provided with the pawl 19 which is able to engage with the hook lug 10 of the tray 6. In FIG. 5, the reference numerals 36, 37 are lock pieces rotatably supported on the upper surface of the elevating plate 12 by shafts 38, 39 and the reference numerals 40, 41 are springs for normally biasing the lock pieces 36, 37, respectively. The lock pieces 36, 37 are engaged with cutouts 42, 43 of the rack plates 23, 24 for slightly locking the rack plates 23, 24, respectively. Upon rotation of the gear 31, the tray transferring mechanism slides the slide member 18 between the left and right ends of the guide hole 16 shown in FIG. 5. This sliding movement allows the tray 6 engaging with the pawl 19 of the slide member 18 to come into or out of the magazine.

Figure 8:
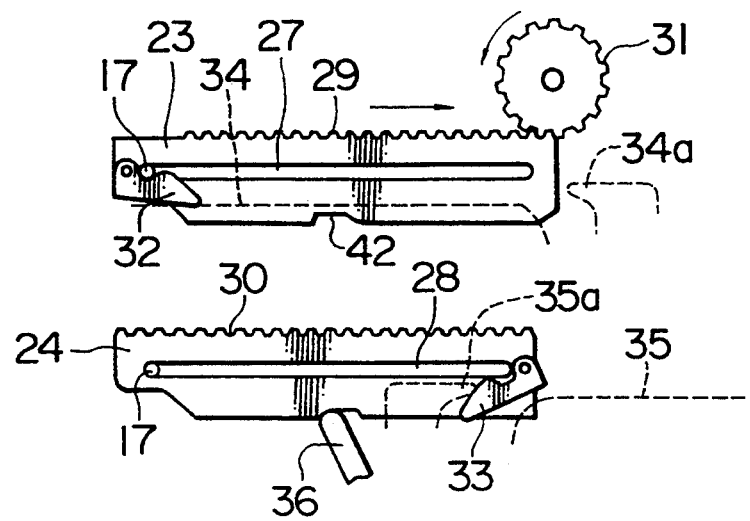
FIG. 8 is a view for explaining operation of the tray withdrawing mechanism in the first embodiment.
Figure 9:
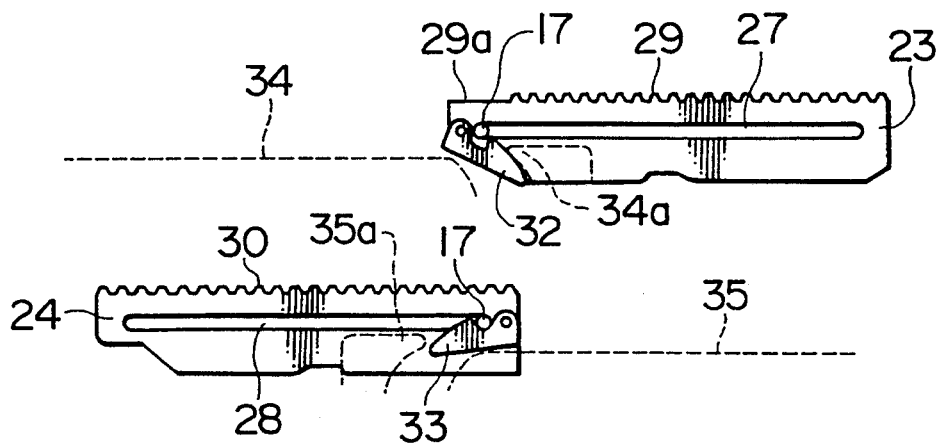
FIG. 9 is a view for explaining operation of the tray withdrawing mechanism in the first embodiment.
Figure 10:
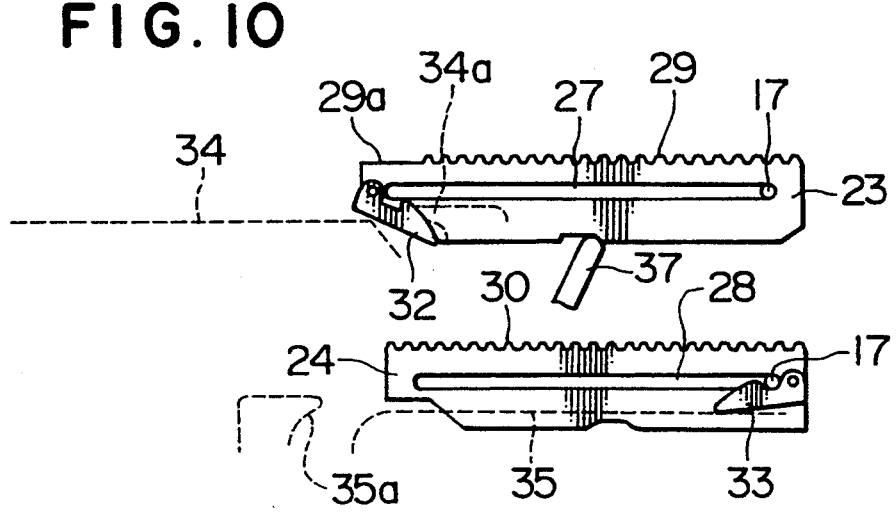
FIG. 10 is a view for explaining operation of the tray withdrawing mechanism in the first embodiment.

Operation of the tray withdrawing mechanism will be next described with reference to FIGS. 8 to 10. It is to be noted that while the rack plates 3, 24 are arranged one above the other as shown in FIG. 7, they are shown as not overlapping with each other in FIGS. 8 to 10 for convenience of illustration. FIG. 8 shows a state that the slide member 18 is positioned close to the magazine as in FIG. 5. In this state, the latch pawl 32 of the first rack plate 23 is turned counterclockwise by the guide surface 34 with the pin 17 held between the latch pawl 32 and the left end of the elongate hole 27. Therefore, when the gear 31 is rotated counterclockwise, the first rack plate 23 held in mesh with the gear 31 slides to the right. Correspondingly, the pin 17 also moves to the right together with the rack plate 23. Because the pin 17 is inserted through a hole in the slide member 18, the rightward movement of the pin 17 causes the slide member 18 to move to the right, whereby the tray 6 engaging with the pawl 19 of the slide member 18 is withdrawn out of the magazine. At this time, since the second rack plate 24 is not held in mesh with the gear 31, the second rack plate 24 will not move to the right and remains stationary regardless of the rightward movement of the first rack plate 23. When the first rack plate 23 is further moved to the right, as shown in FIG. 9, the latch pawl 32 supported on the first rack plate 23 strikes against a projection 34a of the guide surface 34 so that the latch pawl 32 is turned clockwise to be disengaged from the pin 17. Also, at the time the first rack plate 23 comes to the position shown in FIG. 9, the gear 31 does not mesh with the first rack plate 23 any longer and driving of the first rack plate 23 by the gear 31 is completed. The reference numeral 29a denotes a non-toothed portion of the first rack plate 23. While the first rack plate 23 moves from the position shown in FIG. 8 to the position shown in FIG. 9, the pin 17 is moved to the right in the elongate hole 28 of the second rack plate 24 kept in rest and then strikes against an inner wall of the elongate hole 28 at the right end, so that the second rack plate 24 is moved to the right by the pin 17 and comes into mesh with the gear 31. Simultaneously, the latch pawl 33 supported by the second rack plate 24 is turned clockwise by the guide surface 35. Therefore, the pin 17 is now held between the latch pawl 33 and an inner wall of the elongate hole 28 at the right end. Thus, the counterpart meshing with the gear 31 is switched over from the first rack plate 23 to the second rack plate 24 and the counterpart engaging with the pin 17 is also switched over from the first rack plate 23 to the second rack plate 24. Subsequent to the state shown in FIG. 9, the second rack plate 24 is slid to the right by the torque of the gear 31 for further rightward movement of the pin 17. When the second rack plate 24 reaches the position shown in FIG. 10, the slide member 18 actuates a switch (not shown) so that the motor stops its rotation and the second rack plate 24 also stops its movement. In this way, the pin 17 is moved from the left end of the guide hole 16 shown in FIG. 8 to the right end thereof shown in FIG. 10, and the tray 6 is withdrawn out of the magazine by the slide member 18 engaging with the pin 17. The operation of returning the tray 6 back into the magazine in a reversal to the above operation of withdrawing the tray. Thus, by rotating the gear 31 clockwise, the tray returning operation proceeds in sequence of FIG. 10, FIG. 9 and FIG. 8 in this order.

The tray withdrawing mechanism of the illustrated embodiment, as mentioned above, employs the two rack plates 23, 24 in the form of a flat plate as primary parts, the tray withdrawing mechanism can be reduced in thickness. Also, since the tray 6 can be moved through a large distance in combination of respective sliding movements of the two rack plates 23, 34 within a specific limited range, the tray withdrawing mechanism can be reduced in width to result in a small-sized disk changer.

It should be understood that while the above embodiment is explained in connection with the mechanism for withdrawing a tray, the present invention can also be applied to a disk withdrawing mechanism for disk changers of the type that disks are directly accommodated in a magazine without using trays.

What is claimed is:

1. A disk changer, comprising:
    first and second rack members disposed in parallel to each other and supported in a slidable manner;
    a drive source for separately driving said first and second rack members;
    a first latch member for latching a driven member on one end side of said first rack member;
    a second latch member for latching said driven member on an other different end side of said second rack member than said one end side; and
    latching switchover means for switching over latching of said driven member to the other of said rack members when one of said rack members latching said driven member thereon has moved to a predetermined position, such that after said drive source has driven one of said rack members to move said driven member about half of a distance of movement of said driven member, said latching switchover means acts to switch over the latching of said driven member from said latch member of one of said rack members to said latch member of the other of said rack members so that said drive source drives the other of said rack members to move said driven member about the remaining half of a distance of movement of said driven member,
    wherein said latch members for latching said driven member each comprise a latch pawl rotatably supported on the end side of an elongate hole formed in each of said rack members, and a corresponding end wall of said elongate hole.

2. A disk changer according to claim 1, wherein said latching switchover means comprises guide surfaces coming into contact with each of said latch pawls.

* * * * *